US008675657B2

(12) United States Patent
Shiotani

(10) Patent No.: US 8,675,657 B2
(45) Date of Patent: Mar. 18, 2014

(54) WIRELESS COMMUNICATION APPARATUS AND WIRELESS COMMUNICATION METHOD

(75) Inventor: Yoshimitsu Shiotani, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 146 days.

(21) Appl. No.: 13/266,595

(22) PCT Filed: Apr. 23, 2010

(86) PCT No.: PCT/JP2010/057738
§ 371 (c)(1),
(2), (4) Date: Oct. 27, 2011

(87) PCT Pub. No.: WO2010/126153
PCT Pub. Date: Nov. 4, 2010

(65) Prior Publication Data
US 2012/0063342 A1    Mar. 15, 2012

(30) Foreign Application Priority Data

Apr. 27, 2009    (JP) ................................. 2009-107645

(51) Int. Cl.
*H04L 12/28*    (2006.01)

(52) U.S. Cl.
USPC ...................................................... 370/392

(58) Field of Classification Search
USPC ........................... 370/389, 390, 392, 394, 252
See application file for complete search history.

(56) References Cited

U.S. PATENT DOCUMENTS

| 6,160,808 | A  | * | 12/2000 | Maurya .......................... 370/389 |
| 6,307,857 | B1 |   | 10/2001 | Yokoyama et al. |
| 7,558,240 | B2 | * | 7/2009  | Chen et al. ..................... 370/338 |
| 7,590,118 | B2 | * | 9/2009  | Giesberts et al. .............. 370/392 |
| 2004/0233878 | A1 | * | 11/2004 | Liu et al. ........................ 370/338 |
| 2009/0013192 | A1 | * | 1/2009  | Chen et al. ..................... 713/189 |

FOREIGN PATENT DOCUMENTS

| JP | 11 017694   | 1/1999  |
| JP | 2005 012482 | 1/2005  |
| JP | 2006 311394 | 11/2006 |
| JP | 2007 086608 | 4/2007  |
| JP | 2007 208816 | 8/2007  |

OTHER PUBLICATIONS

International Search Report Issued Jul. 27, 2010 in PCT/JP10/057738 Filed Apr. 23, 2010.

* cited by examiner

*Primary Examiner* — Anh Ngoc Nguyen

(74) *Attorney, Agent, or Firm* — Oblon, Spivak, McClelland, Maier & Neustadt, L.L.P.

(57) ABSTRACT

A wireless communication apparatus transmits a packet that includes a destination address, a source address, and a frame body over a wireless network. The wireless communication apparatus computes a first calculation value for use in detecting packet falsification based on a destination address, a source address, and a frame body by using a predetermined computation method, and stores the first calculation value that is associated with the destination address. When a second packet is to be transmitted to a same destination address that is the same as the destination address stored in the storage unit, the wireless communication apparatus computes a second calculation value using the first calculation value stored in the storage unit and the frame body contained in the second packet by using the predetermined computation method.

9 Claims, 8 Drawing Sheets

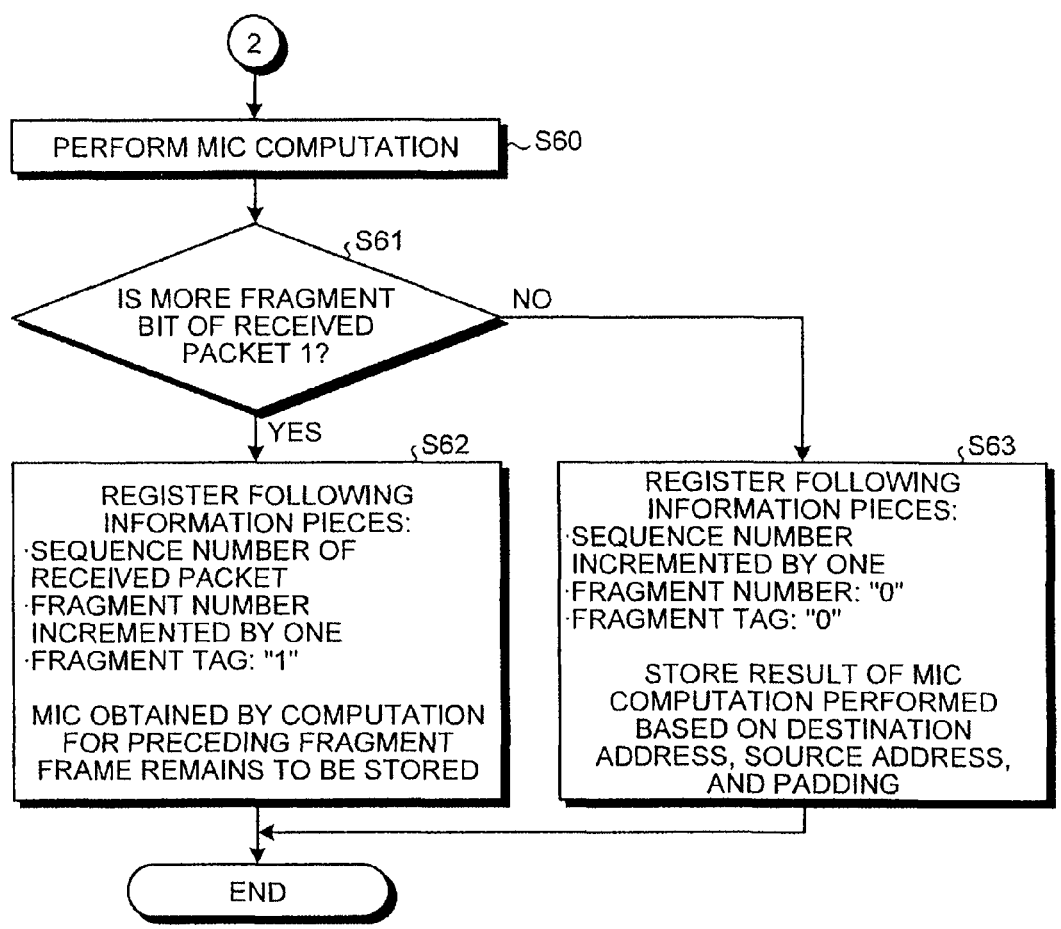

WIRELESS COMMUNICATION APPARATUS AND WIRELESS COMMUNICATION METHOD

TECHNICAL FIELD

The present invention is directed generally to a wireless communication apparatus and a wireless communication method.

BACKGROUND ART

There are growing demands for wireless communication networks, such as wireless LANs (local area networks) defined in the IEEE (Institute of Electrical and Electronics Engineers) 802.11 standards, than ever before, and speed of data transmissions over such a network has become faster and faster. As demands for wireless communication networks increases, enhancement of security techniques has been required. In the IEEE 802.11i standard, TKIP (Temporal Key Integrity Protocol) encryption method and CCMP (Counter Mode with Cipher Block Chaining MAC Protocol) encryption method are standardized to take place of conventional WEP (Wired Equivalent Privacy) encryption method. The TKIP encryption method is defined such that encryption is performed by using, as an encryption algorithm, the RC4, and falsification detection is to be performed by computing a MIC (Message Integrity Check) and an ICV (Integrity Check Value) by using WEP encryption method.

The method for computing a MIC according to IEEE 802.11i will be discussed below. If TKIP has been selected as an encryption method for transferring an encrypted packet, a MIC is computed when a packet is transmitted, and the thus-computed MIC is set within a field (hereinafter, "MIC field") preceded by the frame body of the transmitted packet. When the packet is received, a MIC is computed and compared against a value of the MIC in the MIC field of the received packet to thereby perform integrity check. It is determined that, if these MICs fail to match, the received packet is to be discarded. Data, based on which the MIC is computed, includes a source address, a destination address, and a frame body. MIC computation is performed for each of MSDUs (MAC Service Data Units) generated at a layer higher than MAC layer. The method for computing the MIC is defined in IEEE 802.11i. Specifically, first MIC computation is performed based on a MIC key and a first block of data, the data being obtained by dividing a target packet into blocks (32 bits each) of data and rearranging the blocks of data into a sequential order of destination address, source address, padding, frame body, and padding. An operation of computing a MIC based on a result of this MIC computation and a next block of the rearranged data is repeatedly performed. An eventual result of the MIC computations is employed as an MIC for integrity check. MIC computation for a frame that is divided into fragments (hereinafter, "fragment frames") is performed such that a MIC of a fragment frame is computed by using, in place of a MIC key, a result of MIC computation performed for a preceding fragment frame. By computing a MIC and performing integrity check by using the MIC as discussed above, packet falsification in a wireless communication network is prevented.

Conventionally, the TKIP encryption method is standardized so as to allow replacement by the WEP encryption method relatively easily. MIC computation in the TKIP encryption method is basically performed by software rather than by hardware. However, when MIC computation is performed by software, processing time in microprocessor can disadvantageously increase, thereby causing data transmission speed to drop. MIC computation can be performed, as a technique for preventing such drop in data communication speed, at high speed through hardware. For instance, Japanese Patent Publication Laid-Open No. 2007-086608 discloses a technique for preventing drop in transfer rate by performing MIC computation by hardware and, when a packet is to be retransmitted, by reusing a MIC that has been computed in advance. Japanese Patent Publication Laid-Open No. 2006-311394 discloses a technique for computing an MIC accurately even in an environment where multiple wireless communications are carried out simultaneously and receipt of a fragment frame from another wireless station while receiving fragment frames from one wireless station can occur by storing computed MICs on a wireless-station-by-wireless-station basis.

In view of the above circumstances, a technique that allows efficient MIC computation by hardware and simultaneously effectively prevents drop in transfer rate has been desired.

The present invention has been made in view of the above circumstances, and an object of the present invention is to provide a wireless communication apparatus that allows computation of a calculation value for use in detecting packet falsification by hardware efficiently and effective prevention of drop in transfer rate and a wireless communication method.

DISCLOSURE OF INVENTION

According to an aspect of the present invention, there is provided a wireless communication apparatus that transmits a packet including a destination address, a source address, and a frame body, over a wireless network. The wireless communication apparatus includes a computing unit configured to perform computation to obtain a first calculation value for use in detecting packet falsification based on a destination address, a source address, and a frame body of a first packet by using a predetermined computation method; and a storage unit that stores therein the first calculation value that is associated with the destination address. The computing unit is further configured, when a second packet is to be transmitted to a same destination address that is the same as the destination address stored in the storage unit, to compute a second calculation value using the first calculation value stored in the storage unit and the frame body contained in the second packet by using the predetermined computation method.

According to another aspect of the present invention, there is provided a wireless communication apparatus that receives a packet including a destination address, a source address, and a frame body, over a wireless network. The wireless communication apparatus includes a computing unit configured to perform computation to obtain a first calculation value for use in detecting packet falsification based on a destination address, a source address, and a frame body of a first packet by using a predetermined computation method; and a storage unit that stores therein the first calculation value that is associated with the destination address. The computing unit is further configured, when a second packet is to be received from a same source address that is the same as the source address stored in the storage unit, to compute a second calculation value using the first calculation value stored in the storage unit and the frame body contained in the second packet by using the predetermined computation method.

According to still another aspect of the present invention, there is provided a wireless communication method performed by a wireless communication apparatus. The apparatus transmits a packet including a destination address, a source address, and a frame body, over a wireless network.

The wireless communication apparatus includes a computing unit and a storage control unit. The wireless communication method includes computing a first calculation value for use in detecting packet falsification based on a destination address, a source address, and a frame body of as first packet by using a predetermined computation method; and storing, under control of the storage control unit, the first calculation value that is associated with the destination address in a storage unit. The computing includes computing, when a second packet is to be transmitted to a same destination address that is the same as the destination address stored in the storage unit, a second calculation value using the first calculation value stored in the storage unit and the frame body contained in the second packet by using the predetermined computation method.

BRIEF DESCRIPTION OF DRAWINGS

FIG. 7 is a flowchart illustrating a portion of the processing procedure to be performed by the falsification detection circuit 35 provided in the receiving wireless communication apparatus.

BEST MODE(S) FOR CARRYING OUT THE INVENTION

Exemplary embodiments of a wireless communication apparatus and a wireless communication method according to the present invention will be described in detail with reference to the accompanied drawings.

(1) Configuration

In the present embodiment, an example where a packet encrypted by the TKIP encryption method for a wireless LAN network is transferred from a transmitting wireless communication apparatus to a receiving wireless communication apparatus will be described. Meanwhile, for convenience, when it is not necessary to distinguish between the transmitting wireless communication apparatus and the receiving wireless communication apparatus, the apparatus is simply referred to as "wireless communication apparatus." The hardware configuration of the wireless communication apparatus will be described below. The wireless communication apparatus includes a control device, such as a CPU (central processing unit), that controls the overall wireless communication apparatus, a storage unit, such as a ROM (read only memory) or a RAM (random access memory), that stores various data and computer programs, an auxiliary storage unit, such as a HDD (hard disk drive) or a CD (compact disk) drive, that stores various data and computer programs, a wireless communication unit that controls communications with external equipment, a falsification detection circuit, and a bus that connects these elements together. The falsification detection circuit detects falsification of a packet that is transmitted to and from the wireless communication apparatuses as discussed above. The configuration of the falsification detection circuit on the transmitting side, from which packets are to be transmitted, differs that on the receiving side, at which packets are to be received. Accordingly, the falsification detection circuit provided in the transmitting wireless communication apparatus and the falsification detection circuit provided in the receiving wireless communication apparatus are described separately. Meanwhile, a configuration, in which a single wireless communication apparatus has both a function of transmitting packets and a function of receiving packets and hence includes both the falsification detection circuit on the transmitting side and the falsification detection circuit on the receiving side, which will be described below, can be employed. Alternatively, a configuration, in which a wireless communication apparatus has both the functions but has only one of the falsification detection circuits, can be employed.

Figure 1:
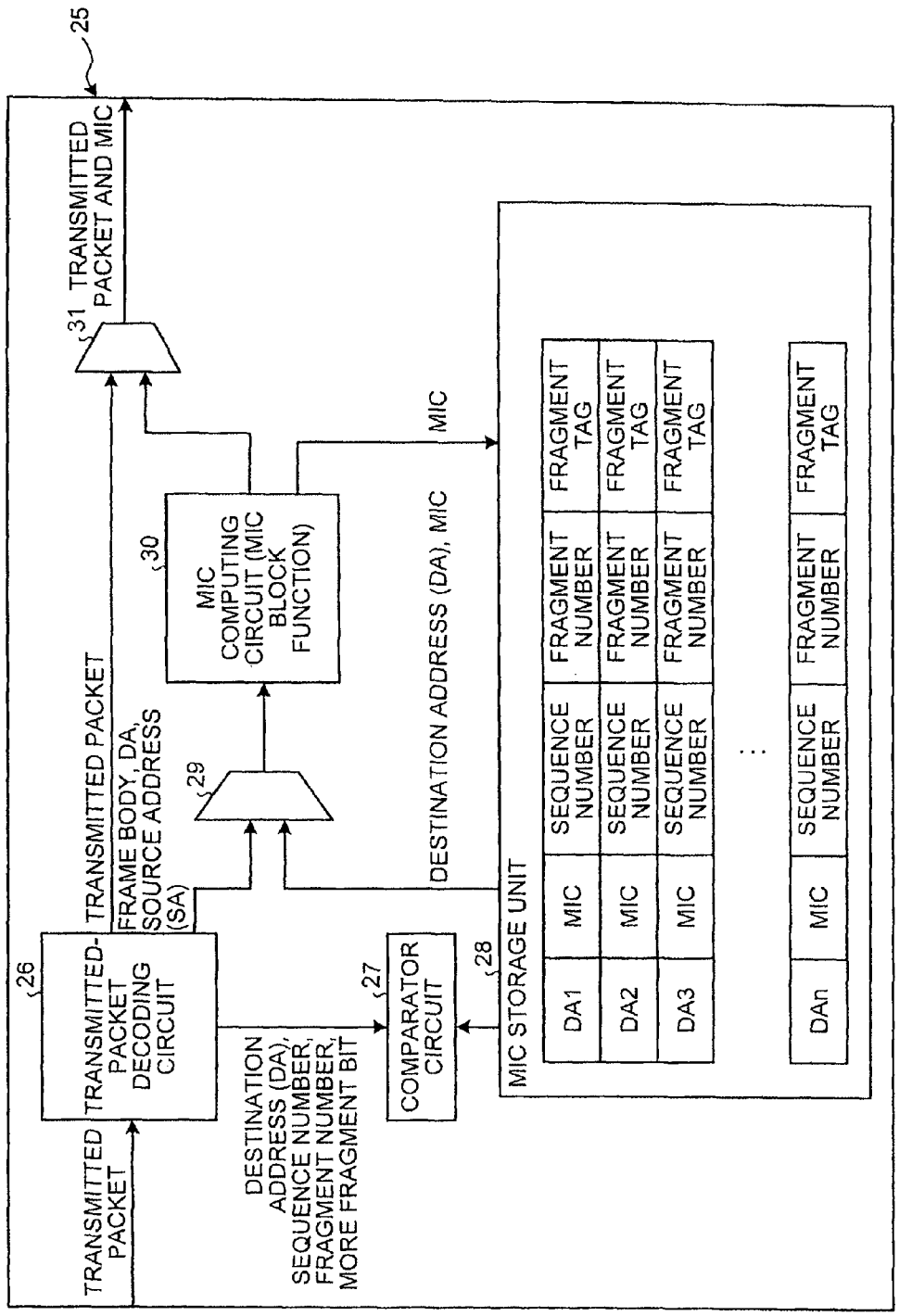
FIG. 1 is a diagram illustrating the hardware configuration of a falsification detection circuit provided in a transmitting wireless communication apparatus according to an embodiment of the present invention.

FIG. 1 is a diagram illustrating the hardware configuration of the falsification detection circuit provided in the transmitting wireless communication apparatus. The falsification detection circuit 25 includes a transmitted-packet decoding circuit 26, a comparator circuit 27, a MIC storage unit 28, logic circuits 29 and 31, and a MIC computing circuit 30. The transmitted-packet decoding circuit 26 is fed with a target packet to be transmitted (hereinafter, "transmitted packet") that is generated by execution of various programs stored in the storage unit and/or the auxiliary storage unit by the control unit. The transmitted packet includes a MAC header, a frame body, and padding. The MAC header includes a destination address, a source address, a sequence number, a fragment number, and a more fragment bit. The transmitted-packet decoding circuit 26 decodes the transmitted packet, and extracts and outputs the destination address, the sequence number, the fragment number, the source address, and the more fragment bit contained in the MAC header. The transmitted-packet decoding circuit 26 also outputs the frame body and the padding.

The destination address is an address assigned to the receiving wireless communication apparatus, at which the packet transmitted from the transmitting wireless communication apparatus is to be received. The source address is an address assigned to the transmitting wireless communication apparatus, from which the packet is transmitted. The more fragment bit indicates whether there is a subsequent packet to be transmitted after the target transmitted packet. For instance, if a target fragment of a transmitted packet that is divided into fragments (transmitted fragment packets) is followed by a subsequent fragment packet to be transmitted to the same destination address, the more fragment bit is set to "1," while, if a transmitted packet is not fragmented or if a target fragment of a fragmented transmitted packet is not followed by a subsequent fragment packet to be transmitted to the same destination address; in other words, if the target fragment packet is a trailing-end transmitted fragment packet, the more fragment bit is set to "0." The fragment tag indicates whether a target fragment of a transmitted packet divided into fragments (hereinafter, "transmitted fragment packets") is during the process of being transferred or not. In the former case, the fragment tag is set to "1" while in the latter case, the fragment tag is set to "0."

Figure 2:
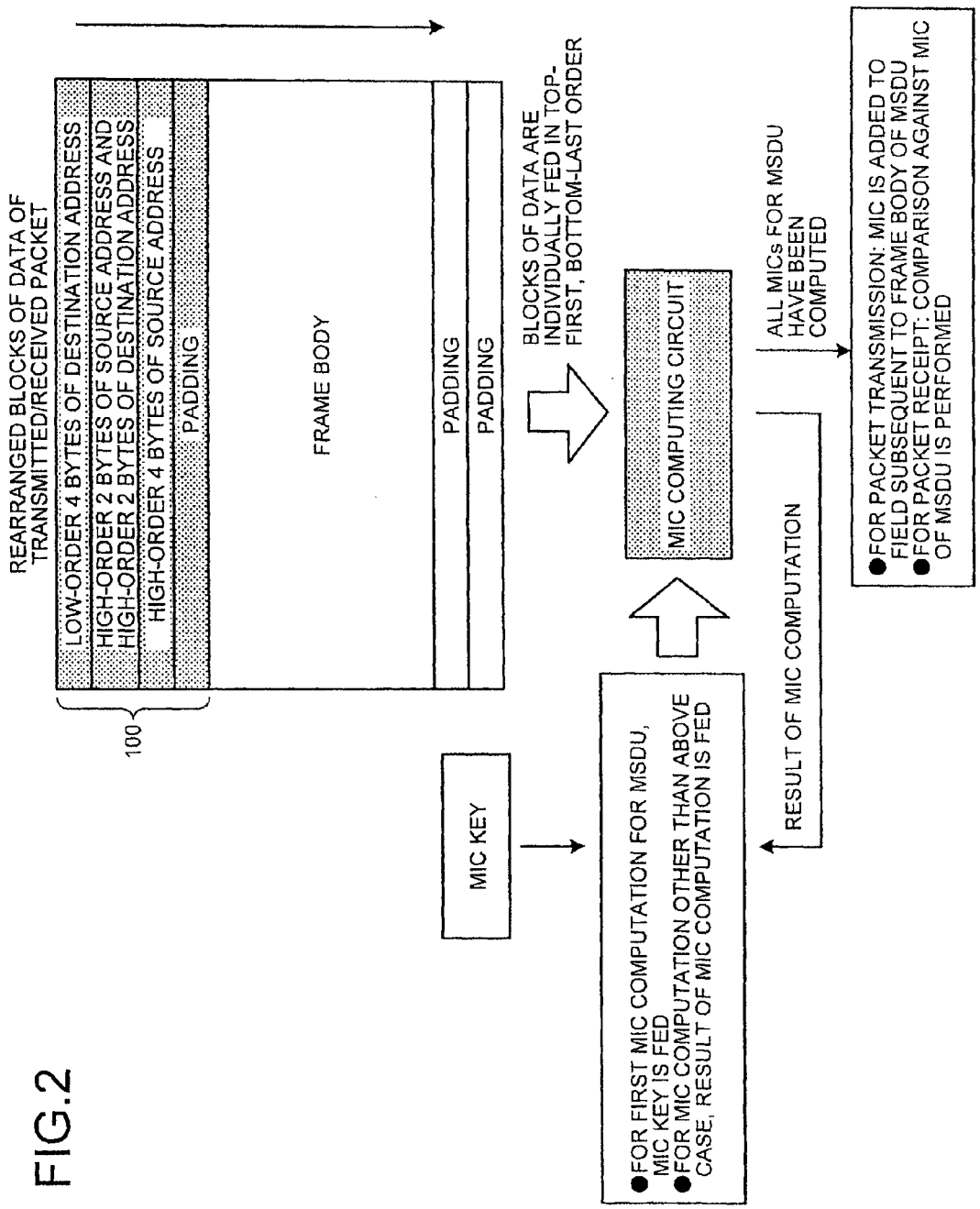
FIG. 2 is a diagram for explaining a MIC computation method.

The MIC computing circuit 30 calculates a MIC for a transmitted packet. A method for computing the MIC will be described briefly. FIG. 2 is a diagram for explaining the MIC computation method. A packet to be transmitted/received is divided into blocks (32 bits each) that are rearranged such that low-order four bytes of a destination address, high-order two bytes of a source address and high-order two bytes of a destination address, high-order four bytes of a source address, padding, a frame body, and padding, and a MIC key are arranged in this sequential order. The blocks of data are individually fed to the MIC computing circuit 30 in the sequential order. For first MIC computation of a fragmented packet, an MIC key is fed the MIC computing circuit 30. This MIC key has been obtained in advance and stored in, for instance, the auxiliary storage unit. The MIC computing circuit 30 computes the MIC based on information fed thereto. MIC computation for a fragment packet subsequent to a fragment packet, for which a MIC has been computed, is performed by feeding the MIC, in place of an MIC key, to the MIC computing circuit 30. In the present embodiment, a MIC having been computed for a fragment packet, by which a target fragment packet is preceded, is stored in the MIC storage unit 28, which will be described later, and computation of a MIC for the target packet is performed based on the stored MIC, thereby increasing efficiency in computation.

The MIC storage unit 28 stores sets of information such that each set is associated with a corresponding destination address and includes a MIC, a sequence number, a fragment number, and a fragment tag (each set is referred to as "transmission management information"). The number of transmission management information sets to be stored on the destination-address-by-destination-address basis depends on hardware implementation and is not particularly specified. Meanwhile, if the value of the fragment tag is "0," the MIC is set to a value of a result of the first MIC computation. The result of first MIC computation is a MIC computed by the MIC computing circuit 30 when four words (indicated by reference numeral 100 in FIG. 2) formed with the destination address, the source address, and the padding are fed to the MIC computing circuit 30. If the value of the fragment tag is "1," the MIC is set to a value of a result of MIC computation based on transmitted packets that have been transferred.

The comparator circuit 27 performs comparison between the information fed from the transmitted-packet decoding circuit 26 and the transmission management information stored in the MIC storage unit 28 and feeds information to the MIC computing circuit 30 according to a result of the comparison. The comparison to be performed by the comparator circuit 27 will be described in detail later. The logic circuit 29 feeds the information output from the MIC storage unit 28 and the information output from the transmitted-packet decoding circuit 26 to the MIC computing circuit 30. The logic circuit 31 adds the MIC computed by the MIC computing circuit 30 to a MIC field, which is preceded by a frame body, of any one of a transmitted non-fragmented packet and a tail-end transmitted fragment packet of a transmitted fragmented packet, and outputs the packet, to which the MIC is added. This packet is transmitted to the receiving wireless communication apparatus via the wireless communication unit.

Figure 3:
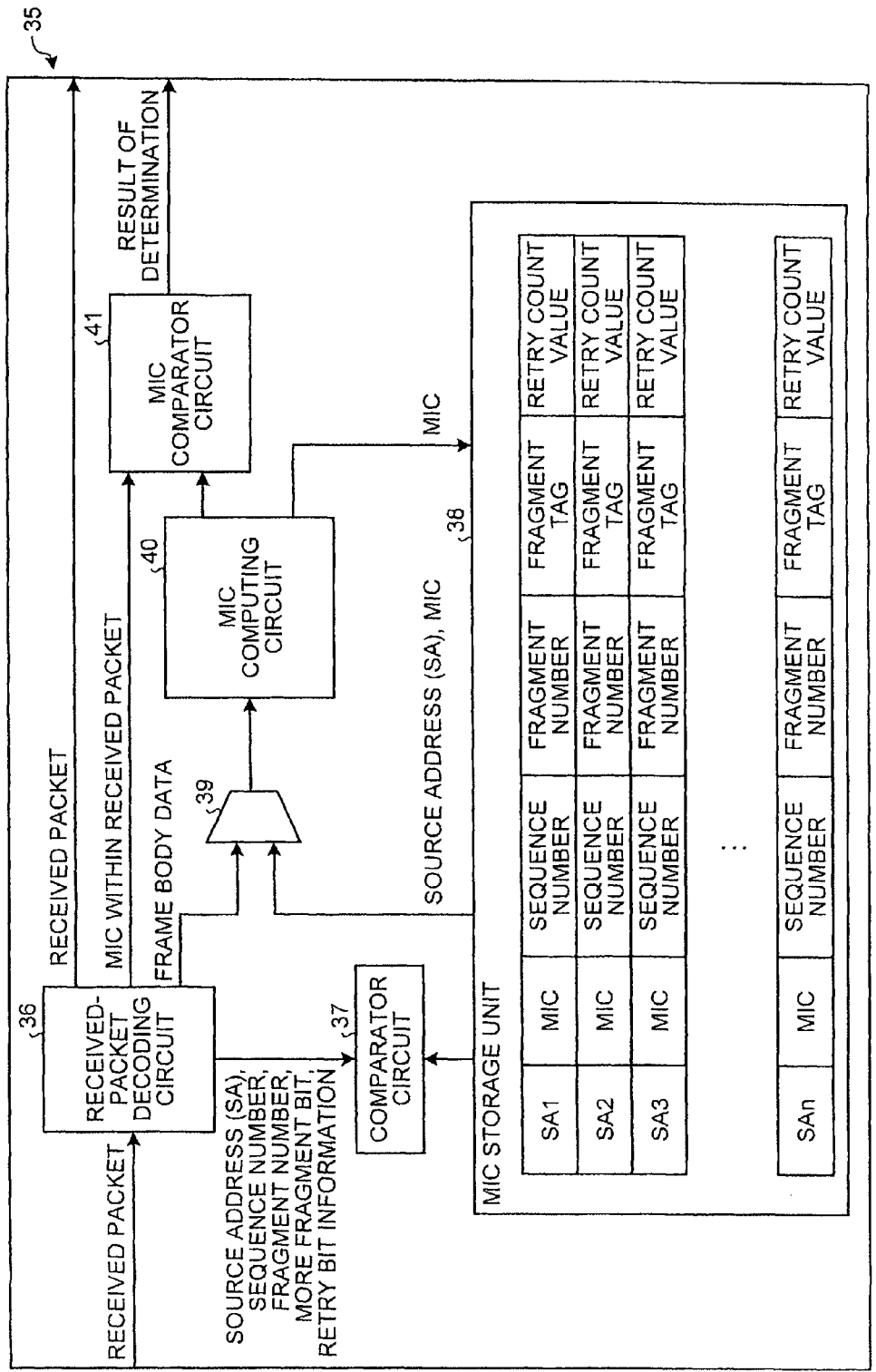
FIG. 3 is a diagram illustrating the hardware configuration of a falsification detection circuit 35 provided in a receiving wireless communication apparatus.

FIG. 3 is a diagram illustrating the hardware configuration of a falsification detection circuit 35 provided in the receiving wireless communication apparatus. The falsification detection circuit 35 includes a received-packet decoding circuit 36, a comparator circuit 37, a logic circuit 39, a MIC computing circuit 40, a MIC storage unit 38, and a MIC comparator circuit 41. The received-packet decoding circuit 36 is fed with a packet (hereinafter, "received packet") received via the wireless communication unit. The data configuration of the received packet is similar to the data configuration of the transmitted packet. The received-packet decoding circuit 36 decodes the received packet, and extracts and outputs a destination address, a sequence number, a fragment number, a source address, and a more fragment bit contained in a MAC header of the received packet. The received-packet decoding circuit 36 also outputs a frame body and padding.

The MIC storage unit 38 stores sets of information such that each set is associated with a corresponding source address and includes a MIC, a sequence number, a fragment number, a fragment tag, and a retry count value (each set is referred to as "receipt management information"). The number of receipt management information sets to be stored on the source-address-by-source-address basis depends on hardware implementation and is not particularly specified. Meanwhile, if the value of the fragment tag is "0," the MIC is set to a value of a result of first MIC computation. If the value of the fragment tag is "1," the MIC is set to a value of a result of the MIC computation based on received packets that have been transferred. The retry count value is the number of times a single packet is retransmitted from the same source address. To limit the number of times for such packet retransmissions, a retry threshold value is set in advance and stored in, for instance, the auxiliary storage unit.

The comparator circuit 37 performs comparison between the information fed from the received-packet decoding circuit 36 and the receipt management information stored in the MIC storage unit 38, and feeds information to the MIC computing circuit 40 according to a result of the comparison. The comparison to be performed by the comparator circuit 37 will be described in detail later. The MIC computing circuit 40 calculates a MIC for the received packet. Because the method for calculating the MIC is substantially similar to that performed by the MIC computing circuit 30, repeated description is omitted. When MIC computation for either a received non-fragmented packet or a received trailing-end fragment packet of a received packet that is fragmented is completed, the MIC computing circuit 40 outputs a result of the MIC computation. The MIC comparator circuit 41 performs comparison between the MIC output from the MIC computing circuit 40 and the MIC set within the MIC field, which is preceded by the frame body, of the received packet, and outputs a result of the comparison. When the result of this comparison indicates that a match between the MICs has not occurred, it is detected that the received packet can have been falsified.

(2) Operations

Figure 4:
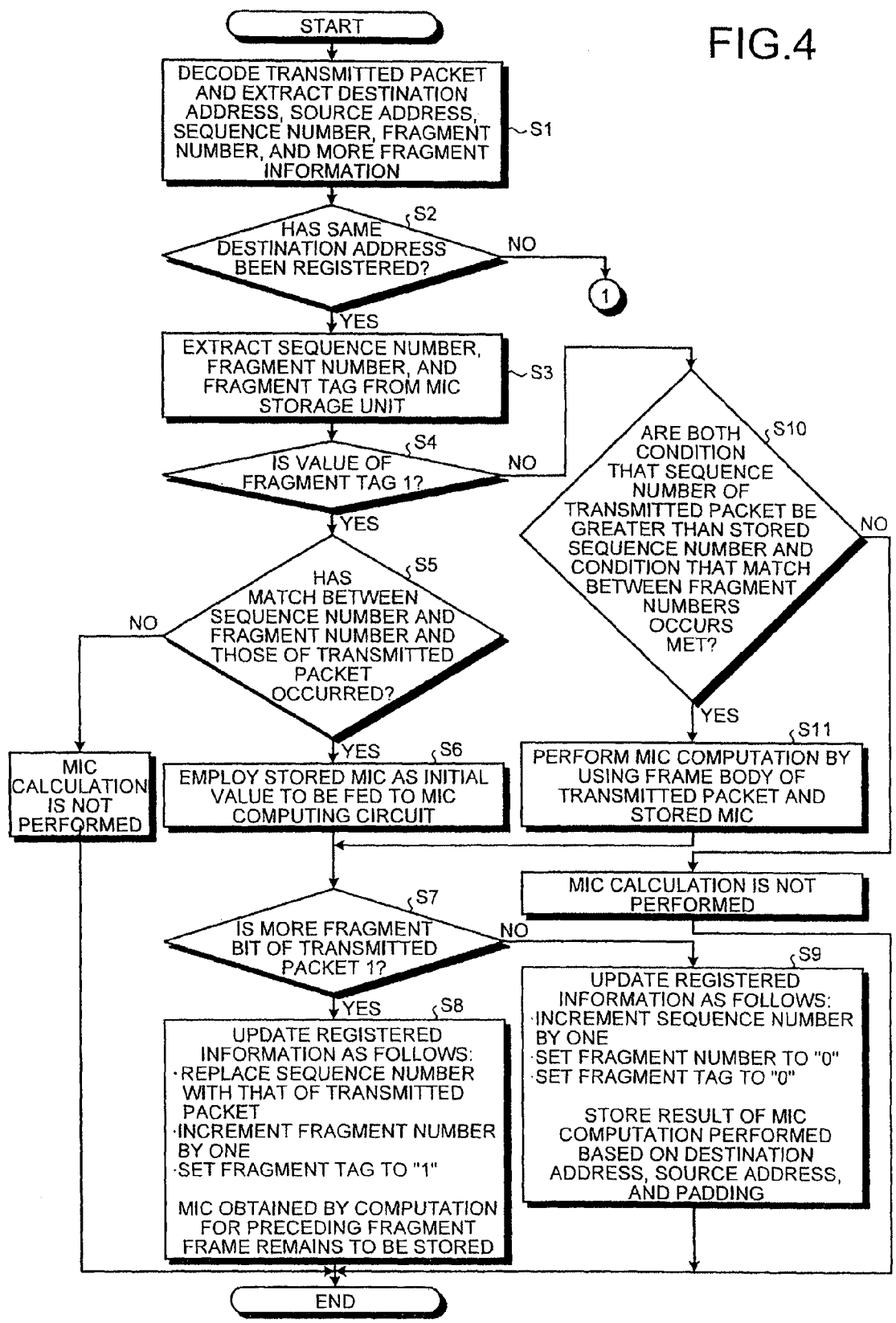
FIG. 4 is a flowchart illustrating a processing procedure to be performed by a falsification detection circuit 25 provided in the transmitting wireless communication apparatus.
Figure 5:
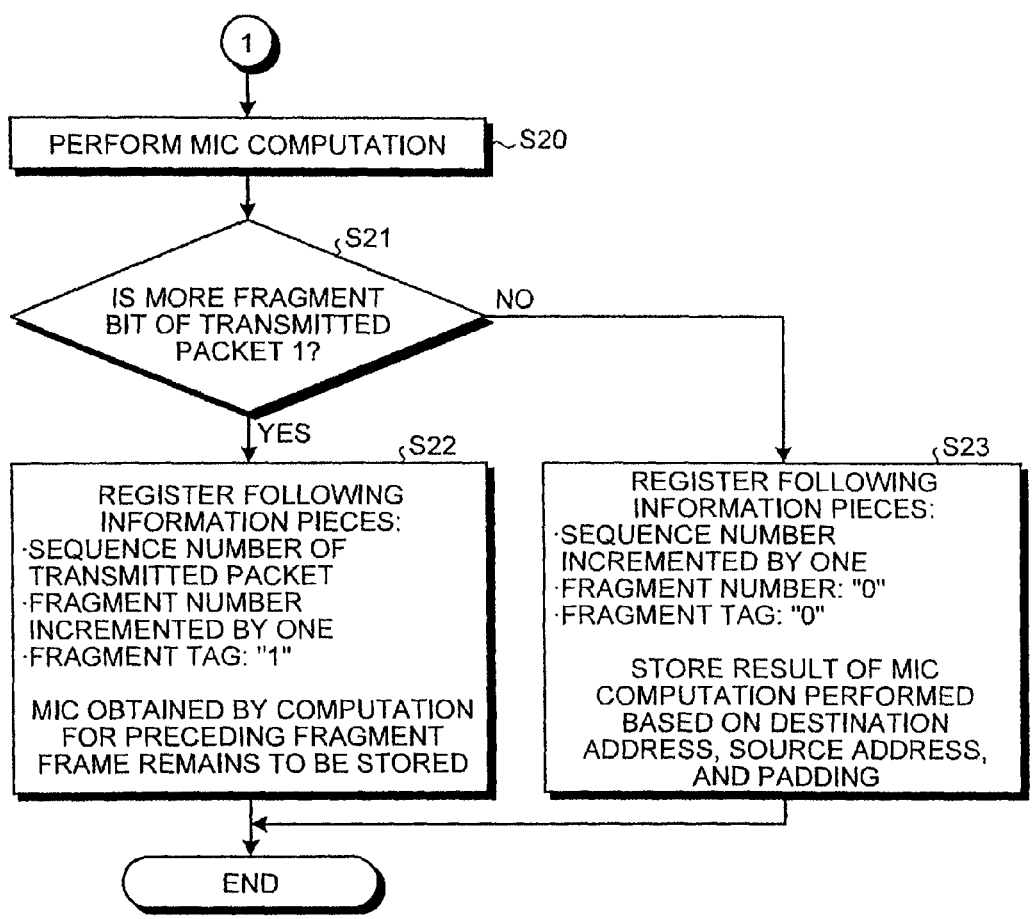
FIG. 5 is a flowchart illustrating a portion of the processing procedure to be performed by the falsification detection circuit 25 provided in the transmitting wireless communication apparatus.

The processing procedure to be performed by the falsification detection circuit 25 provided in the transmitting wireless communication apparatus according to the present embodiment will be described below with reference to FIGS. 4 and 5. When a transmitted packet is fed to the falsification detection circuit 25, the transmitted-packet decoding circuit 26 decodes the transmitted packet, and extracts and outputs a destination address, a sequence number, a fragment number, a source address, and a more fragment bit contained in a MAC header of the transmitted packet (Step S1). Thereafter, the comparator circuit 27 determines whether transmission management information being associated with the destination address output from the transmitted-packet decoding circuit 26 at Step S1 is stored in the MIC storage unit 28 (Step S2). If the transmission management information associated with the destination address is not stored in the MIC storage unit 28 (NO at Step S2), the logic circuit 29 sequentially feeds the destination address, the source address, the padding, and the frame body output from the transmitted-packet decoding circuit 26 at Step S1 to the MIC computing circuit 30 on a block-of-data-by-block-of-data basis. The MIC computing circuit 30 performs MIC computation based on the destination address, the source address, the padding, and the frame body fed from the logic circuit 29 (Step S20 in the procedure of FIG. 5). The comparator circuit 27 determines whether the more fragment bit output from the transmitted-packet decoding circuit 26 at Step S1 is "1" (Step S21). If the more fragment bit is "1" (YES at Step S21), transmission management information that contains the destination address output from the transmitted-packet decoding circuit 26 at Step S1, the sequence number, and a fragment number, which is created by incrementing the fragmented number contained in the MAC header by one, is generated and stored in the MIC storage unit 28. The comparator circuit 27 then sets the fragment tag of the transmission management information to "1" and sets the MIC of the transmission management information to a value obtained as the result of the MIC computation performed at Step S20 (Step S22). If the more fragment bit output from the transmitted-packet decoding circuit 26 at Step S1 is "0" (NO at Step S21), the comparator circuit 27 generates transmission management information that contains the destination address output from the transmitted-packet decoding circuit 26 at Step S1 and a sequence number, which is created by incrementing the sequence number output from the transmitted-packet decoding circuit 26 at Step S1 by one, and stores the transmission management information in the MIC storage unit 28. The comparator circuit 27 then sets the fragment number of the transmission management information to "0," sets the fragment tag of the transmission management information to "0," and sets the MIC of the transmission management information to a value obtained as the result of the first MIC computation discussed above (Step S23). As discussed above, if transmission management information being associated with a destination address of a transmitted packet is not stored in the MIC storage unit 28, the falsification detection circuit 25 generates transmission management information according to a more fragment bit and stores this transmission management information in the MIC storage unit 28.

When, after the transmission management information has been stored in the MIC storage unit 28 as discussed above, a transmitted packet of which MAC header contains the same destination address is fed to the falsification detection circuit 25, YES is obtained as a result of determination made at Step S2. In this case, the comparator circuit 27 extracts the sequence number, the fragment number, and the fragment tag, which are contained in the transmission management information, that are associated with the destination address output from the transmitted-packet decoding circuit 26 at Step S1 and stored in the MIC storage unit 28 (Step S3). Subsequently, the comparator circuit 27 determines whether the value of the fragment tag extracted at Step S3 is "1" (Step S4). If the value of the fragment tag is "1" (YES at Step S4), the comparator circuit 27 determines whether a match between the sequence number output from the transmitted-packet decoding circuit 26 at Step S1 and the sequence number extracted from the transmission management information at Step S3 and a match between the fragment number output from the transmitted-packet decoding circuit 26 at Step S1 and the fragment number extracted from the transmission management information at Step S3 have occurred (Step S5). If both the match between the sequence numbers and the match between the fragment numbers have occurred (YES at Step S5), the logic circuit 29 feeds, as a MIC initial value, the MIC contained in the transmission management information to the MIC computing circuit 30 and simultaneously feeds the destination address, the source address, the padding, and the frame body output from the transmitted-packet decoding circuit 26 at Step S1 on a block-of-data-by-block-of-data basis in the sequential order to the MIC computing circuit 30. The MIC computing circuit 30 then computes a MIC by using the MIC, which is fed from the logic circuit 29 and serves as the MIC initial value, and by sequentially using the destination address, the source address, the padding, and the frame body (Step S6).

Subsequently, the comparator circuit 27 determines whether the more fragment bit output from the transmitted-packet decoding circuit 26 at Step S1 is "1" (Step S7). If the more fragment bit is "1" (YES at Step S7), the transmitted packet is fragmented and during the process of being transferred. In this case, the comparator circuit 27 updates the transmission management information, which is stored in the MIC storage unit 28, for a subsequent packet to be transmitted next by replacing the sequence number and the fragment number contained in the transmission management information with the sequence number output from the transmitted-packet decoding circuit 26 at Step S1 and a fragment number, which is created by incrementing the fragment number output from the transmitted-packet decoding circuit 26 at Step S1 by one, and setting the fragment tag contained in the transmission management information to "1" (Step S8). Note that the MIC contained in the transmission management information is not updated but remains the same MIC obtained by the computation performed for a preceding transmitted packet that has been processed prior to the currently-processed transmitted packet. In contrast, if the more fragment bit is "0" (NO at Step S7), the comparator circuit 27 updates the transmission management information, which is stored in the MIC storage unit 28, for a subsequent packet to be transmitted next by replacing the sequence number contained in the transmission management information with a sequence number, which is created by incrementing the fragment number output from the transmitted-packet decoding circuit 26 at Step S1 by one, setting the fragment number contained in the transmission management information to "0," and setting the fragment tag contained in the transmission management information to "0." The comparator circuit 27 further updates the MIC contained in the transmission management information to a value of the MIC computed at Step S6 based on the destination address, the source address, and the padding (Step S9).

When the value of the fragment tag is "0" (NO at Step S4), the transmitted packet, which is fragmented, is not during a process of being transferred. In this case, the comparator circuit 27 determines whether the sequence number output from the transmitted-packet decoding circuit 26 at Step S1 is greater than the sequence number contained in the transmission management information stored in the MIC storage unit 28 and whether the fragment number output from the transmitted-packet decoding circuit 26 at Step S1 matches the fragment number contained in the transmission management information stored in the MIC storage unit 28; in other words, whether the fragment number is "0" (Step S10). If both a condition that the former sequence number is greater than the latter sequence number and a condition that the former fragment number matches the latter fragment number are met (YES at Step S10), the logic circuit 29 feeds the MIC contained in the transmission management information and the frame body contained in the transmitted packet that has been decoded by the transmitted-packet decoding circuit 26 at Step S1 to the MIC computing circuit 30. The MIC computing circuit 30 performs another MIC computation based on the thus-fed MIC and the frame body (Step S11).

If at least any one the match of the sequence numbers and the match of the fragment numbers between the transmitted packet and the transmission management information has not occurred (NO at Step S5), or if any one of the condition that the sequence number of the transmitted packet is greater than the sequence number of the transmission management information and the condition that a match of the fragment numbers between the received packet and the transmission management information occurs is not met (NO at Step S10), the MIC computing circuit 30 does not perform MIC computation. When MIC computation for any one of a transmitted non-fragmented packet and a transmitted trailing-end packet of a transmitted packet that is fragmented is completed, the MIC computing circuit 30 outputs a result of the MIC computation. The logic circuit 31 adds this MIC to a field preceded by the frame body of the transmitted packet. The transmitted packet is transmitted to the receiving wireless communication apparatus via the wireless communication unit.

Figure 6A:
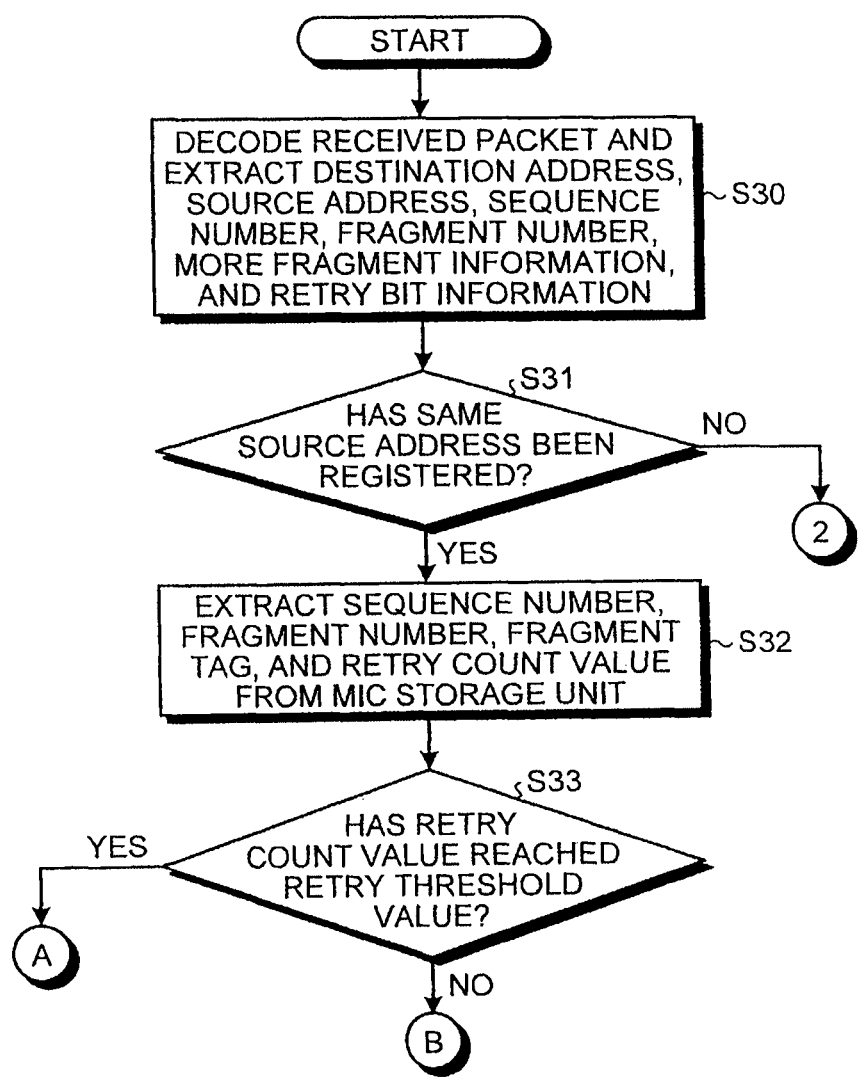
FIGS. 6A and 6B are flowcharts illustrating a processing procedure to be performed by the falsification detection circuit 35 provided in the receiving wireless communication apparatus.
Figure 6B:
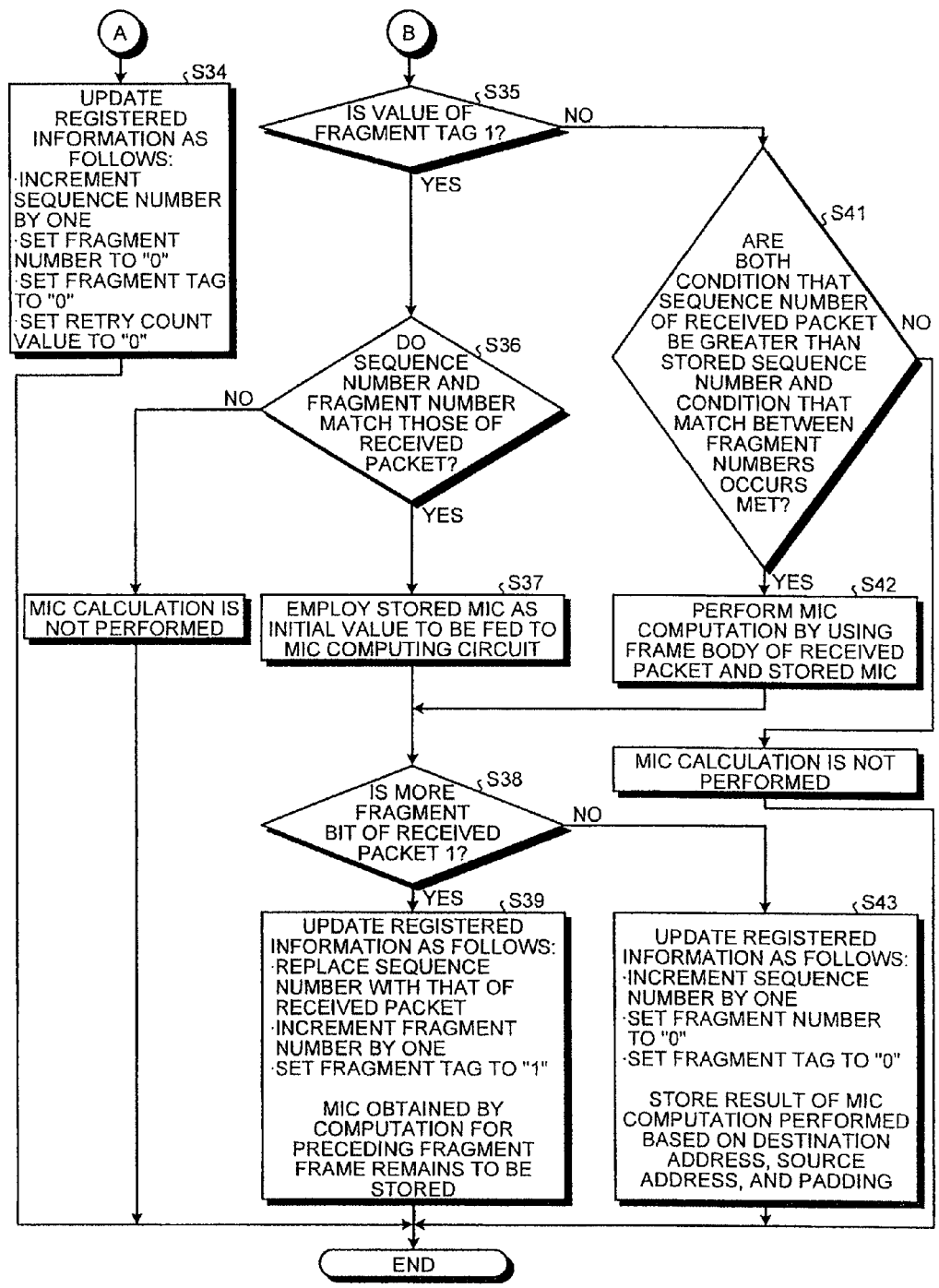

The processing procedure to be performed by the falsification detection circuit 35 provided in the receiving wireless communication apparatus will be described below with reference to FIGS. 6A, 6B and 7. When a received packet transmitted from the transmitting wireless communication apparatus and received by the wireless communication apparatus is fed to the received-packet decoding circuit 36 of the falsification detection circuit 35 via the wireless communication unit, the received-packet decoding circuit 36 decodes the received packet, and extracts and outputs a source address, a destination address, a sequence number, a fragment number, and a more fragment bit contained in a MAC header of the received packet (Step S30). Thereafter, the comparator circuit 37 determines whether receipt management information that is associated with the source address output from the received-packet decoding circuit 36 at Step S30 is stored in the MIC storage unit 38 (Step S31). If the receipt management information associated with the source address is not stored in the MIC storage unit 38 (NO at Step S31), the logic circuit 39 sequentially feeds the destination address, the source address, the padding, and the frame body output from the received-packet decoding circuit 36 at Step S30 on a block-of-data-by-block-of-data basis to the MIC computing circuit 40. The MIC computing circuit 40 computes a MIC based on the destination address, the source address, the padding, and the frame body fed from the logic circuit 39 (Step S60 in the procedure of FIG. 7). The comparator circuit 37 determines whether the more fragment bit output from the received-packet decoding circuit 36 at Step S30 is "1" (Step S61). If the more fragment bit is "1" (YES at Step S61), receipt management information that contains the source address output from the received-packet decoding circuit 36 at Step S30, the sequence number, and a fragment number, which is created by incrementing the fragmented number contained in the MAC header by one, is generated and stored in the MIC storage unit 38. The comparator circuit 37 then sets the fragment tag of the receipt management information to "1" and sets the MIC of the receipt management information to a value obtained as the result of the MIC computation performed at Step S60 (Step S62). If the more fragment bit output from the received-packet decoding circuit 36 at Step S30 is "0" (NO at Step S61), the comparator circuit 37 generates receipt management information that contains the destination address output from the received-packet decoding circuit 36 at Step S30 and a sequence number, which is created by incrementing the sequence number output from the received-packet decoding circuit 36 at Step S30 by one, and stores the receipt management information in the MIC storage unit 38. The comparator circuit 37 then sets the fragment number of the receipt management information to "0," sets the fragment tag of the receipt management information to "0," and sets the MIC of the receipt management information to a value obtained as the result of the first MIC computation discussed above (Step S63). As discussed above, if receipt management information associated with a source address of a received packet is not stored in the MIC storage unit 38, the falsification detection circuit 35 generates receipt management information according to a more fragment bit and stores this receipt management information in the MIC storage unit 38.

When, after the receipt management information has been stored in the MIC storage unit 38 as discussed above, a receipt packet of which MAC header contains the same source address is fed to the falsification detection circuit 35, YES is obtained as a result of determination made at Step S31. In this case, the comparator circuit 37 extracts the sequence number, the fragment number, the fragment tag, and the retry count value, which are contained in the receipt management information, that are associated with the source address output from the received-packet decoding circuit 36 at Step S30 and stored in the MIC storage unit 38 (Step S32). Subsequently, the comparator circuit 37 determines whether the retry count value extracted at Step S32 has reached the retry threshold value (Step S33). If the retry count value has reached the retry threshold value (YES at Step S33), the comparator circuit 37 generates receipt management information that contains the destination address output from the received-packet decoding circuit 36 at Step S30 and a sequence number, which is created by incrementing the sequence number output from the received-packet decoding circuit 36 by one, and stores the receipt management information in the MIC storage unit 38. The comparator circuit 37 then sets each of the fragment number and the fragment tag of the receipt management information to "0." The comparator circuit 37 further resets each of the retry count value and the MIC of the receipt management information to "0" (Step S34). Thus, if a retry count of a received packet exceeds the retry threshold value, receipt management information about the received packet is deleted and receipt management information about a received packet to be received next is written to take place of the deleted receipt management information. Meanwhile, if the retry count value has reached the retry threshold value, the MIC computing circuit 40 does not perform MIC calculation.

If the retry count value has not reached the retry threshold value (NO at Step S33), the comparator circuit 37 determines whether the value of the fragment tag extracted at Step S30 is "1" (Step S35). If the value of the fragment tag is "1" (YES at Step S35), the comparator circuit 37 determines whether a match between the sequence number output from the received-packet decoding circuit 36 at Step S30 and the sequence number extracted from the receipt management information at Step S32 and a match between the fragment number output from the received-packet decoding circuit 36 at Step S30 and the fragment number extracted from the receipt management information at Step S32 have occurred (Step S36). If both the match between the sequence numbers and the match between the fragment numbers have occurred (YES at Step S36), the logic circuit 39 feeds, as a MIC initial value, the MIC contained in the receipt management information to the MIC computing circuit 40 and sequentially feeds the destination address, the source address, the padding, and the frame body output from the received-packet decoding circuit 36 at Step S30 on a block-of-data-by-block-of-data basis to the MIC computing circuit 40. The MIC computing circuit 40 then computes a MIC based on the MIC, which is fed from the logic circuit 39 and serves as the MIC initial value, and by sequentially using the destination address, the source address, the padding, and the frame body (Step S37).

Subsequently, the comparator circuit 37 determines whether the more fragment bit output from the received-packet decoding circuit 36 at Step S30 is "1" (Step S38). If the more fragment bit is "1" (YES at Step S38), the received packet is fragmented and during the process of being transferred. In this case, the comparator circuit 37 updates the receipt management information, which is stored in the MIC storage unit 38, for a packet to be received next by replacing the sequence number and the fragment number contained in the receipt management information with the sequence number output from the received-packet decoding circuit 36 at Step S30 and a fragment number, which is created by incrementing the sequence number output from the received-packet decoding circuit 36 at Step S30 by one, and setting the fragment tag contained in the receipt management information to "1" (Step S39). Note that the MIC contained in the receipt management information is not updated but remains the same MIC obtained by the computation performed for a preceding received packet that has been processed prior to the currently-processed received packet. In contrast, if the more fragment bit is "0" (NO at Step S38), the comparator circuit 37 updates the receipt management information, which is stored in the MIC storage unit 38, for a packet to be received next by replacing the sequence number contained in the receipt management information with a sequence number, which is created by incrementing the fragment number output from the received-packet decoding circuit 36 at Step S30 by one, setting the fragment number contained in the receipt management information to "0," and setting the fragment tag contained in the receipt management information to "0." The comparator circuit 37 further updates the MIC contained in the receipt management information to a value of the result of the MIC computation performed at Step S37 based on the destination address, the source address, and the padding (Step S43).

When the value of the fragment tag is "0" (NO at Step S35), the received packet, which is fragmented, is not during a process of being transferred. In this case, the comparator circuit 37 determines whether the sequence number output from the received-packet decoding circuit 36 at Step S30 is greater than the sequence number contained in the receipt management information stored in the MIC storage unit 38 and whether the fragment number output from the received-packet decoding circuit 36 at Step S30 matches the fragment number contained in the receipt management information stored in the MIC storage unit 38; in other words, whether the fragment number is "0" (Step S41). If both a condition that the former sequence number is greater than the latter sequence number and a condition that the former fragment number matches the latter fragment number are met (YES at Step S41), the logic circuit 39 feeds the MIC contained in the receipt management information and the frame body contained in the received packet that has been decoded by the received-packet decoding circuit 36 at Step S30 to the MIC computing circuit 40. The MIC computing circuit 40 performs another MIC computation based on the thus-fed MIC and the frame body (Step S42).

If at least any one the match of the sequence numbers and the match of the fragment numbers between the received packet and the receipt management information has not occurred (NO at Step S36), or if any one of the condition that the sequence number of the received packet is greater than the sequence number of the receipt management information and the condition that a match of the fragment numbers between the received packet and the receipt management information occurs is not met (NO at Step S41), the MIC computing circuit 40 does not perform MIC computation. When MIC computation for either a received non-fragmented packet or a received trailing-end fragment packet of a received packet that is fragmented is completed, the MIC computing circuit 40 outputs a result of the MIC computation. The MIC comparator circuit 41 performs comparison between the thus-output MIC and the MIC set within the MIC field, which is preceded by the frame body, of the received packet, and outputs a result of the comparison. When the result of this comparison indicates that a match between the MICs has not occurred, it is detected that the received packet can have been falsified.

With the configuration discussed above, MIC computation involved in MIC comparison that is performed to detect falsification of a wirelessly-transmitted packet is performed by hardware. Accordingly, the MIC computation can be performed efficiently, and drop in transfer rate can be prevented.

Modifications

The present invention is not limited to the foregoing embodiments; when being practiced, the invention can be implemented with constituent elements variously modified within the scope of the invention. Furthermore, various embodiments can be obtained by suitably combining a plurality of constituent elements disclosed in the embodiments. For instance, some constituent elements described in the embodiments may be omitted from the constituent elements. Constituent elements of different embodiments may be combined suitably. Furthermore, various modifications, some of which are discussed below, can be made.

The computer programs to be executed by the wireless communication apparatus in the embodiments discussed above can be stored in a computer connected to a network, such as the Internet, so that the computer programs are provided by downloading via the network. The computer programs can be configured so as to be provided as being recorded in a computer-readable recording medium, such as a compact disc-read-only memory (CD-ROM), a flexible disk (FD), a CD recordable (CD-R), or a digital versatile disk (DVD), in an installable or executable format.

The wireless communication apparatus that includes the falsification detection circuit discussed in the embodiments can be applied to an image forming apparatus. Examples of the image forming apparatus include multifunction peripherals that provide at least two functions of a copier function, a printer function, a scanner apparatus, and a facsimile function, and apparatuses, such as a copying machine, a printer, a scanner apparatus, and a facsimile apparatus, that provides an image forming function.

In the embodiments discussed above, an example where transmitting a packet encrypted by the TKIP encryption method over a wireless LAN network has been described; however, the wireless communication network and the encryption method are not limited thereto.

In the embodiments discussed above, the transmitting wireless communication apparatus is configured to cause the MIC computation to be performed by the MIC computing circuit 30. Alternatively, there can be employed another configuration, in which, when a capacity of the MIC storage unit 28 is smaller than a predetermined size, the CPU executes computer programs to thereby perform the MIC computation. In this case, as in the MIC computing circuit 30 discussed above, the computer programs for the MIC computation can be stored in, for instance, an auxiliary storage unit, such as an HDD, so that if the capacity of the MIC storage unit 28 is smaller than the predetermined size and when a packet is to be transmitted, the CPU can read out the computer programs from the auxiliary storage unit to perform packet transmission. This is also applicable to the receiving wireless communication apparatus; as in the MIC computing circuit 40 discussed above, the computer programs for the MIC computation can be stored in, for instance, an auxiliary storage unit, such as an HDD, so that if the capacity of the MIC storage unit 38 is smaller than the predetermined size and when a packet is to be received, the CPU can read out the computer programs from the auxiliary storage unit to perform packet receipt.

The invention claimed is:

1. A wireless communication apparatus that transmits a packet including a destination address, a source address, and a frame body, over a wireless network, the wireless communication apparatus comprising:
   a computing unit configured to perform computation to obtain a first calculation value for use in detecting packet falsification based on a destination address, a source address, and a frame body of a first packet by using a predetermined computation method; and
   a storage unit that stores therein the first calculation value that is associated with the destination address, wherein
   the computing unit is further configured, when a second packet is to be transmitted to a same destination address that is the same as the destination address stored in the storage unit, to compute a second calculation value using the first calculation value stored in the storage unit and the frame body contained in the second packet by using the predetermined computation method, wherein
   the first packet includes a sequence number, a fragment number, and a more fragment bit,
   the storage unit stores therein, on a destination-address-by-destination-address basis, the first calculation value and a sequence number, a fragment number, and a more fragment bit of a subsequent packet that is to be transmitted subsequent to the first packet,
   the storage unit stores therein, on a destination-address-by-destination-address basis, first calculation values that are individually computed for fragment packets, the fragment packets being fragmented and transmitted, and when some fragment packets of the fragment packets are to be transmitted to a single destination address,
   the computing unit is configured to compute the second calculation value using the first calculation values stored in the storage unit and the frame bodies contained in the some fragment packets.

2. The wireless communication apparatus according to claim 1, wherein when a match between the destination address, the sequence number, the fragment number, and the more fragment bit contained in one of the fragment packets and the sequence number, the fragment number, and the more fragment bit stored in the storage unit associated with the destination address occurs, the computing unit computes the second calculation value using the first calculation value that is associated with the destination address stored in the storage unit and the frame body contained in the one of the fragment packets.

3. The wireless communication apparatus according to claim 1, further comprising an adding unit that adds, when a trailing-end fragment packet of the fragment packets is to be transmitted, the second calculation value computed by the computing unit to the trailing-end fragment packet.

4. The wireless communication apparatus according to claim 1, wherein the computing unit includes:
   a computing circuit for use in computing the calculation values;
   a program storage unit that stores computer program that computes the calculation values; and
   a control unit that executes the computer program stored in the program storage unit to thereby cause the calculation values to be computed when capacity of the storage unit is smaller than a predetermined size.

5. A wireless communication apparatus that receives a packet including a destination address, a source address, and a frame body, over a wireless network, the wireless communication apparatus comprising:
   a computing unit configured to perform computation to obtain a first calculation value for use in detecting packet falsification based on a destination address, a source address, and a frame body of a first packet by using a predetermined computation method; and
   a storage unit that stores therein the first calculation value that is associated with the destination address, wherein
   the computing unit is further configured, when a second packet is to be received from a same source address that is the same as the source address stored in the storage unit, to compute a second calculation value using the first calculation value stored in the storage unit and the frame body contained in the second packet by using the predetermined computation method, wherein
   the first packet includes a sequence number, a fragment number, and a more fragment bit,
   the storage unit stores therein, on a source-address-by-source-address basis, the first calculation value and a sequence number, a fragment number, and a more fragment bit of a subsequent packet that is to be received subsequent to the first packet,
   the storage unit stores therein, on a source-address-by-source-address basis, first calculation values that are individually computed for fragment packets, the fragment packets being fragmented and received, and
   when some fragment packets of the fragment packets are to be received from a single source address, the computing unit is configured to compute the second calculation value using the first calculation values stored in the storage unit and the frame bodies contained in the some fragment packets.

6. The wireless communication apparatus according to claim 5, wherein when a match between the source address, the sequence number, the fragment number, and the more fragment bit contained in one of the fragment packets and the sequence number, the fragment number, and the more fragment bit stored in the storage unit associated with the source address occurs, the computing unit computes the second calculation value using the first calculation value that is associated with the source address stored in the storage unit and the frame body contained in the one of the fragment packets.

7. The wireless communication apparatus according to claim 5, further comprising a comparing unit, wherein
   the second calculation value computed by the computing unit is added to a trailing-end fragment packet of the fragment packets, and
   when the trailing-end fragment packet is received, the comparing unit performs comparison between the second calculation value computed for the trailing-end fragment packet by the computing unit and the second calculation value added to the trailing-end fragment packet, and outputs a result of the comparison.

8. The wireless communication apparatus according to claim 5, wherein the storage unit stores, on a source-address-by-source-address basis, the first calculation value and retry count of the packet, and when the retry count has reached a retry threshold value, the first calculation value and the retry count that are associated with the source address stored in the storage unit are deleted.

9. A wireless communication method performed by a wireless communication apparatus that transmits a packet including a destination address, a source address, and a frame body, over a wireless network, the wireless communication apparatus including a computing unit and a storage control unit, the wireless communication method comprising:

computing a first calculation value for use in detecting packet falsification based on a destination address, a source address, and a frame body of a first packet by using a predetermined computation method; and storing, under control of the storage control unit, the first calculation value that is associated with the destination address in a storage unit, wherein the computing includes computing, when a second packet is to be transmitted to a same destination address that is the same as the destination address stored in the storage unit, a second calculation value using the first calculation value stored in the storage unit and the frame body contained in the second packet by using the predetermined computation method, wherein the first packet includes a sequence number, a fragment number, and a more fragment bit, the storage unit stores therein, on a destination-address-by-destination-address basis, the first calculation value and a sequence number, a fragment number, and a more fragment bit of a subsequent packet that is to be transmitted subsequent to the first packet, the storage unit stores therein, on a destination-address-by-destination-address basis, first calculation values that are individually computed for fragment packets, the fragment packets being fragmented and transmitted, and when some fragment packets of the fragment packets are to be transmitted to a single destination address, the computing unit computes the second calculation value using the first calculation values stored in the storage unit and the frame bodies contained in the some fragment packets.

* * * * *